United States Patent [19]

Randall

[11] Patent Number: 5,003,672

[45] Date of Patent: Apr. 2, 1991

[54] SHOCK CORD AND COVER ASSEMBLY

[76] Inventor: Ovid Randall, 9 E. Main St., Clifton Springs, N.Y. 14432

[21] Appl. No.: 527,852

[22] Filed: May 24, 1990

[51] Int. Cl.[5] .............................................. F16G 11/00
[52] U.S. Cl. ................................. 24/300; 24/115 M; 24/136 R; 24/136 L
[58] Field of Search ................. 24/300, 301, 371, 298, 24/339, 343, 136 R, 136 L, 115 M, 113 MP

[56] References Cited

U.S. PATENT DOCUMENTS

| 969,195 | 9/1910 | Rothstein | 24/115 M |
| 2,223,153 | 11/1940 | Seifer | 24/115 M |
| 2,913,791 | 11/1959 | Martin | 24/115 M |
| 3,184,880 | 5/1965 | Ratte | 24/115 M |
| 3,751,772 | 8/1973 | Grandjanny | 24/136 R |
| 3,904,814 | 9/1975 | Dawson et al. | 24/136 R |
| 3,960,461 | 6/1976 | Sachs | 24/136 L |
| 4,918,791 | 4/1990 | Hardin | 24/113 MP |

FOREIGN PATENT DOCUMENTS

| 8700898 | 2/1987 | European Pat. Off. | 24/115 M |
| 953926 | 12/1949 | France | 24/115 M |
| 0958406 | 3/1950 | France | 24/300 |
| 2447871 | 10/1980 | France | 24/300 |

Primary Examiner—Victor N. Sakran
Attorney, Agent, or Firm—Leon Gilden

[57] ABSTRACT

An organization including a shock cord defined by elongate elastomeric cord including a rigid hook member mounted to each terminal end of the cord with the including a body fixedly secured to the cord and a hook directed downwardly overlying the body. The cover assembly includes a conical cover including a tapered neck portion wherein the neck portion surroundingly and slidingly engages the elastomeric cord to permit overlying covering of the hook member during periods of non-use to prevent snagging of the cord upon undesirable objects.

Modifications of the invention include a cover assembly formed of a sponge fluid absorbent material including a conduit member to permit allocation of fluid into the cover to insure ease of slidability of the cover relative to the cord as well as providing a protectant about the hook member to prolong longevity of the hook and cord during use. Further modification includes a split cover assembly fixedly mounted about the hook to provide selective access to the hook and a further cover formed of a flexible fabric utilizing hook and loop fastener portions formed about spaced lateral edges of the cover to permit surrounding covering of the hook as desired.

1 Claim, 4 Drawing Sheets

SHOCK CORD AND COVER ASSEMBLY

BACKGROUND OF THE INVENTION

1. Field of the Invention

The field of the invention relates to cover apparatus, and more particularly pertains to a new and improved shock cord and cover assembly wherein the same permits selective covering of an associated hook member of a shock cord unit to surroundingly cover and prevent inadvertent snagging of the hook during periods of non-use.

2. Description of the Prior Art

The use of shock cord members that are formed with elastomeric cords and rigid hook portions fixedly mounted to each end of the cord are of notorious and well known use in fastening and securing various members together. In the prior art, the free ends or hook portions have been subject to snagging and grasping of miscellaneous objects creating inconvenience and at times a hazard in their use.

The instant invention attempts to overcome deficiencies of the prior art by providing a shock cord and cover assembly that encloses the hook but permits access to the hook during periods of need in use. Examples of the prior art include U.S. Pat. No. 4,539,731 to TORRINI sets forth a button enclosure for overlying a button of a shirt cuff to simulate utilization of cuff-links.

U.S. Pat. No. 3,757,388 to WLNEY sets forth a garment button cover to protect damage to the buttons during transport of associated garments.

U.S. Pat. No. 675,155 to HEIZ sets forth a clasp to secure shoe laces in a fixed orientation.

U.S. Pat. No. 3,153,973 to MARIETTA sets forth a pad for shielding an exposed end of a fastener for utilization interiorly of football helmets and the like.

U.S. Pat. No. 4,249,287 to TADD sets forth a tab buckle for a tab of a pair of trousers to overly and cover a button exposed on exterior portions of the tab.

As such, it may be appreciated that there continues to be a need for a new and improved shock cord and cover assembly which addresses both the problems of ease of use as well as effectiveness in construction in providing protection of an exposed hook portion of a shock cord cover assembly and in this respect, the present invention substantially fulfills this need.

SUMMARY OF THE INVENTION

In view of the foregoing disadvantages inherent in the known types of cover assemblies present in the prior art, the present invention provides a new and improved shock cord and cover assembly wherein the same provides a cover to provide selective covering of an associated hook portion of a shock cord. As such, the general purpose of the present invention, which will be described subsequently in greater detial, is to provide a new and improved shock cord and cover assembly which has all the advantages of the prior art cover assemblies and none of the disadvantages.

To attain this, the invention includes an organization including a shock cord defined by elongate elastomeric cord including a rigid hook member mounted to each terminal end of the cord with the including a body fixedly secured to the cord and a hook directed downwardly overlying the body. The cover assembly includes a conical cover including a tapered neck portion wherein the neck portion surroundingly and slidingly engages the elastomeric cord to permit overlying covering of the hook member during periods of non-use of prevent snagging of the cord upon undesirable objects. Modifications of the invention include a cover assembly formed of a sponge fluid absorbent material including a conduit member to permit allocation of fluid into the cover to insure ease of slidability of the cover relative to the cord as well as providing a protectant about the hook member to prolong longevity of the hook and cord during use. Further modification includes a split cover assembly fixedly mounted about the hook to provide selective access to the hook and a further cover formed of a flexible fabric utilizing hook and loop fastener portions formed about spaced lateral edges of the cover to permit surrounding covering of the hook as desired.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved shock cord and cover assembly which has all the advantages of the prior art cover assemblies and none of the disadvantages.

It is another object of the present invention to provide a new and improved shock cord and cover assembly which may be easily and efficiently manufactured and marketed.

It is a further object of the present invention to provide a new and improved shock cord and cover assembly which is of a durable and reliable construction.

An even further object of the present invention is to provide a new and improved shock cord and cover assembly which is susceptible of a low cost of manufacture with regard to both materials and labor, and which accordingly is then susceptible of low prices of sale to the consuming public, thereby making such shock cord and cover assemblies economically available to the buying public.

Still yet another object of the present invention is to provide a new and improved shock cord and cover assembly which provides in the apparatuses and methods of the prior art some of the advantages thereof, while simultaneously overcoming some of the disadvantages normally associated therewith.

Still another object of the present invention is to provide a new and improved shock cord and cover assembly which may be compactly stored when not being utilized.

Yet another object of the present invention is to provide a new and improved shock cord and cover assembly wherein the same provides selective and surrounding covering of a hook portion of an associated shock cord assembly to provide protection and disengage the hook portion from inadvertent grasping of various foreign objects.

These together with other objects of the invenion, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawing wherein.

DESCRIPTION OF THE PREFERRED EMBODIMENT

Figure 1:
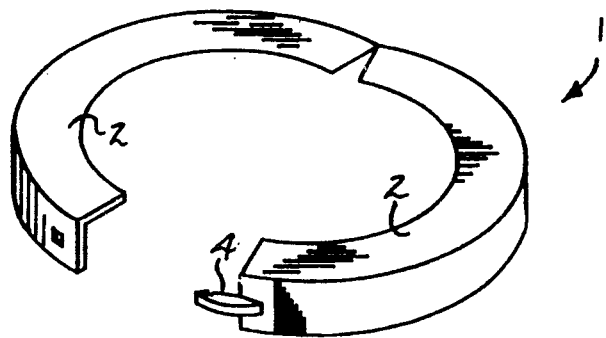
FIG. 1 is an isometric illustration of a prior art cover assembly.

With reference now to the drawings, and in particular to FIGS. 1 to 9 thereof, a new and improved shock cord and cover assembly embodying the principles and concepts of the present invention and generally designated by the reference numeral 10 will be described.

Figure 2:
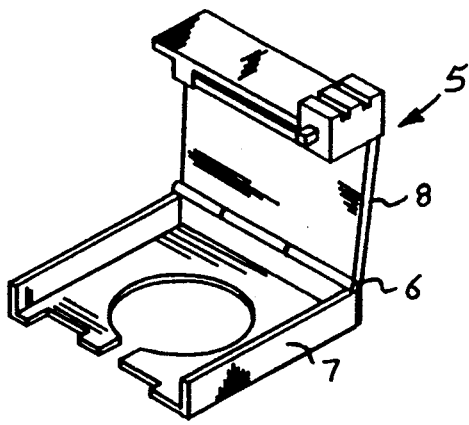
FIG. 2 is an isometric illustration of a further prior art cover assembly.
Figure 3:
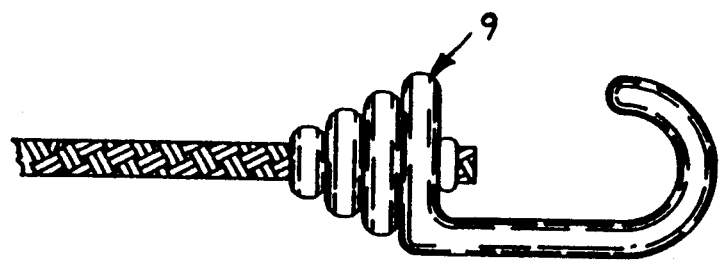
FIG. 3 is an orthographic side view taken in elevation of a typical shock cord member.

FIG. 1 illustrates a prior art cover assembly 1 wherein a first and second arcuate leg member 2 and 3 include a clasp portion to secure the leg members together to overly a butt assembly 2 for simulation of a cuff-link on a shirt sleeve cuff. FIG. 2 is a further modification of a button cover utilizing a plurality of members including a base portion 7 including a circular opening directed therethrough to receive a button therewithin with a cover 8 arranged for closure over the base portion. FIG. 3 illustrates a conventional shock cord member 9.

Figure 4:
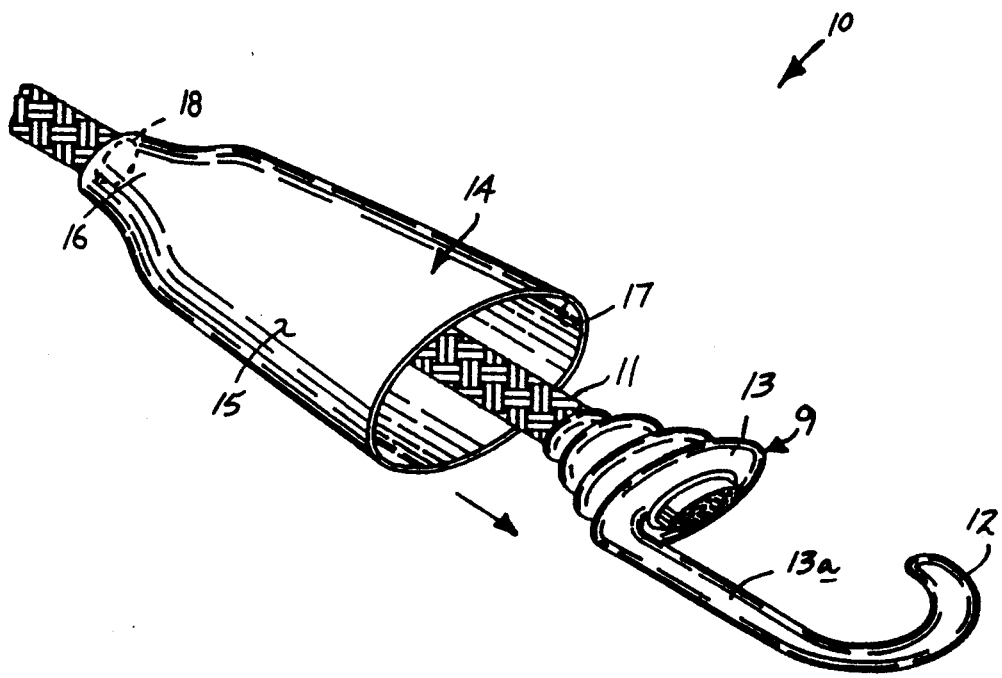
FIG. 4 is an isometric illustration of the instant invention.
Figure 5:
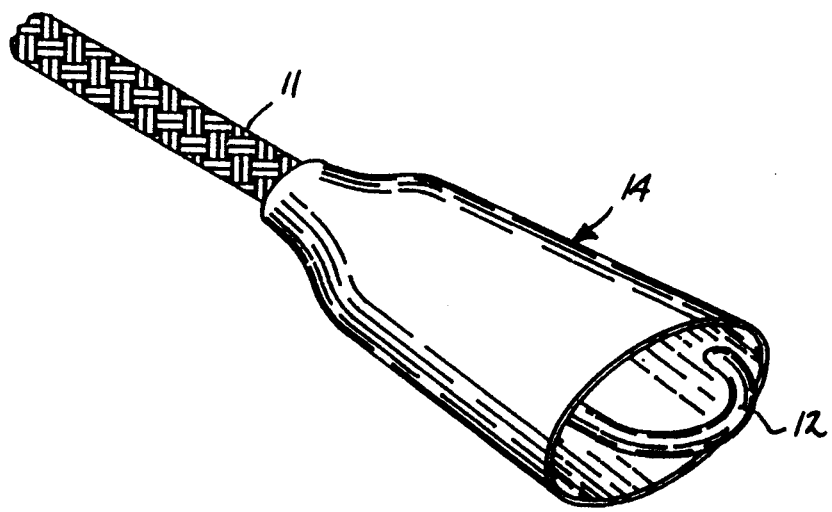
FIG. 5 is an isometric illustration of the instant invention in a covering orientation relative to an associated shock cord.

More specifically, the shock cord and cover assembly 10 of the instant invention is illustrated in FIG. 4 wherein the shock cord 9 as illustrated in FIG. 3 notes the use of elongate elastomeric cord 11 typically formed with a hook member 12 at each end thereof wherein for purposes of illustration in as much as each hook member is identical, only one of such hook members is illustrated. The hook member 12 is fixedly mounted to a wound base 13 that encompasses and secures the elastomeric cord 11 relative to the wound base with a connecting leg 13a securing the hook member 12 to the base. The hook member 12 is directed downwardly towards the base. The cover housing includes a flexible cover housing 14 axially aligned defining an axial length substantially equal to or greater than that of the hook member 9 including the wound base 13 and hook member 12. The axially aligned body includes a conical main body portion 15 and a narrowed neck body portion 16. The narrowed neck body portion 16 includes a first opening 17 defined by a first diameter substantially equal to that of the elastomeric cord 11 to frictionally and surroundingly engage the elastomeric cord 11 to provide frictional positioning of the cover housing 14 as desired about the elastomeric cord 11. The main body portion 15 includes a second opening 18 defined by a second diameter substantially equal to or greater than a diameter defined by the wound base and width of the hook member 13 and 12 respectively to permit overlying and surrounding relationship relative to the hook member 12 and wound base when the cover housing 14 is slid forwardly to overly the hook member as illustrated in FIG. 5.

Figure 6:
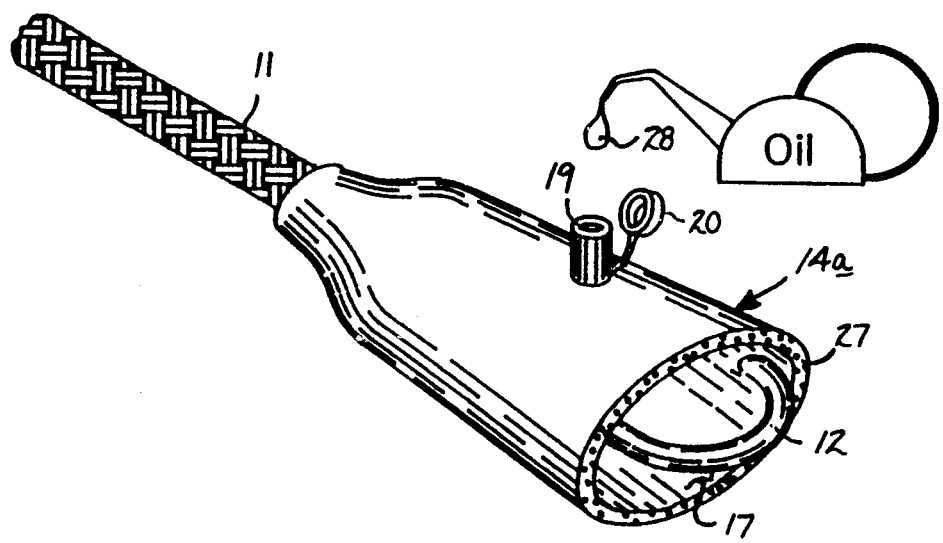
FIG. 6 is an isometric illustration of a modification of the instant invention.

FIG. 6 illustrates a modification of the instant invention including a modified cover housing 14a configured with a first and second openings 17 and 18 in a manner as described above wherein the cover housing 14 includes a sponge fluid absorbent liner 27 formed coextensively through an interior surface of the cover housing. A conduit 19 is formed through the cover housing 14 in fluid communication with the absorbent liner 27 includes a cover cap 20. Accordingly, a lubricating and moisture dispelling fluid such as lubricating oil 28 is directed through the conduit 19 into communication with the liner 27 to permit ease of sliding of the modified cover housing 14a about the elastomeric cord 11 as well as insuring dispelling of moisture and the like from association with the hook member 12 further permitting a coating of the hook member 12 upon compression of the main body portion of the modified cover housing 14a about the hook member to enhance its ease of grasping of various objects in use.

Figure 7:
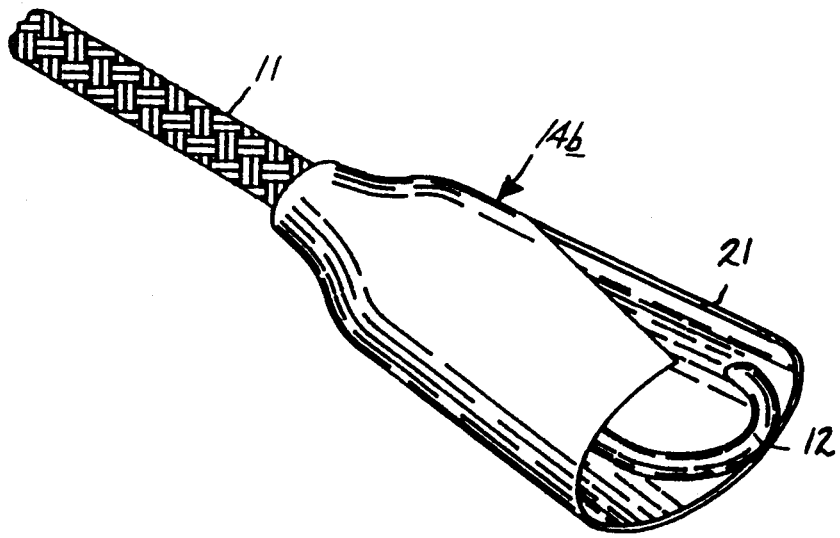
FIG. 7 is an isometric illustration of a further modification of the instant invention.

FIG. 7 illustrates a further modified main body housing 14b utilizing a V-shaped split 21 wherein the further modified cover housing 14b is fixedly mounted relative to the elastomeric cord 11 whereupon the cover housing 14b is merely separated to gain access to the hook 12 during use.

Figure 8:
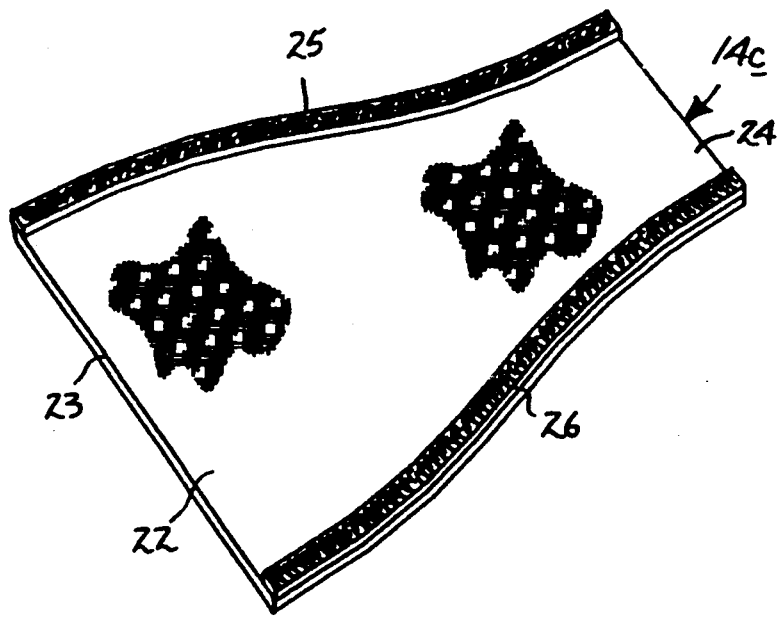
FIG. 8 is an isometric illustration of a yet further modification of the instant invention.
Figure 9:
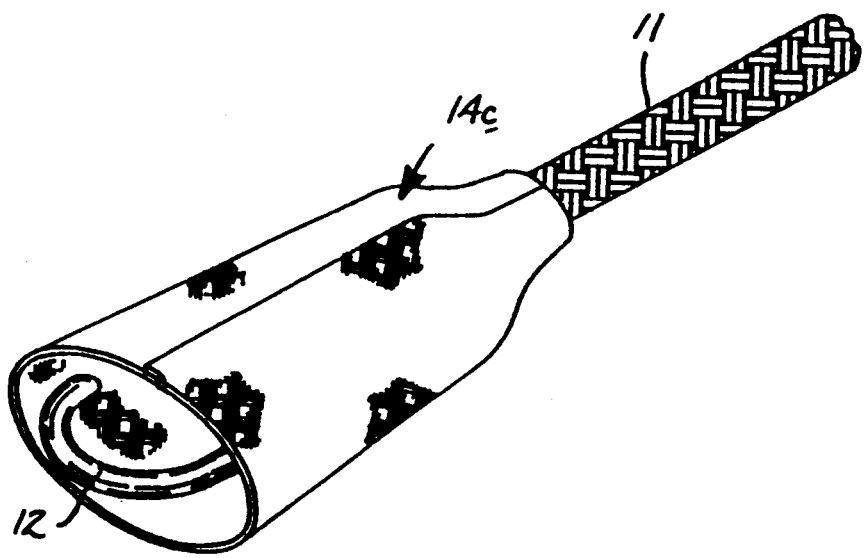
FIG. 9 is an isometric illustration of the invention as illustrated in FIG. 8 in association with a shock cord member.

FIG. 8 illustrates a yet further modified cover housing 14c defined as a flexible fabric cover sheet 22 including a forward edge 23 spaced from and parallel a rear cover edge 24. A first and second hook and loop fastener edge 24 and 25 are formed at each lateral edge portion of the sheet 22 between the forward and rear edges 23 and 24 respectively to permit surrounding enveloping of an associated hook 12 as illustrated in FIG. 9.

As to the manner of usage and operation of the instant invention, the same should be apparent from the above disclosure and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A shock cord and cover assembly comprising in combination,
   a shock cord including an elongate elastomeric cord defined by a predetermined diameter, the elastomeric cord including a hook assembly fixedly mounted to at least one terminal end of the cord, the hook assembly defined by a predetermined length, the hook assembly further including a base fixedly secured to the elastomeric cord with a connecting leg extending upwardly from the base spaced from the elastomeric cord wherein the connecting leg terminates in a hook member directed downwardly projecting towards the base, and
   a flexible cover housing, the flexible cover housing slidably mounted about the elastomeric cord to permit selective covering of the hook assembly, and
   wherein the flexible cover housing includes a conical main body portion and a narrowed neck body portion defining a forward terminal end of the main body portion, the narrowed neck portion and the conical body portion coaxially aligned defining the flexible cover housing, and
   wherein the narrowed neck portion includes a first opening defined by a first diameter, the first diameter is substantially equal to the predetermined diameter to effect surrounding engagement of the elastomeric cord, and
   wherein the conical body portion includes a second opening, the second opening defined by a second diameter, the first diameter and second diameter coaxially aligned relative to one another with the second diameter substantially equal to or greater than a predetermined width defined by the hook assembly, and
   wherein the flexible cover housing is defined by a cover housing length, the cover housing length equal to or greater than the predetermined length defined by the hook assembly, and
   wherein the flexible cover housing includes a fluid absorbent sponge liner coextensively formed throughout an interior surface defined by the flexible cover housing, and
   including a conduit directed through the main body portion of the cover housing in fluid communication with the liner, the conduit including a cap selectively securable overlying the conduit to permit directing of a lubricating fluid to the liner.

* * * * *